(No Model.) 2 Sheets—Sheet 1.
T. V. NORRIS.
POWER HAMMER.
No. 341,045. Patented May 4, 1886.
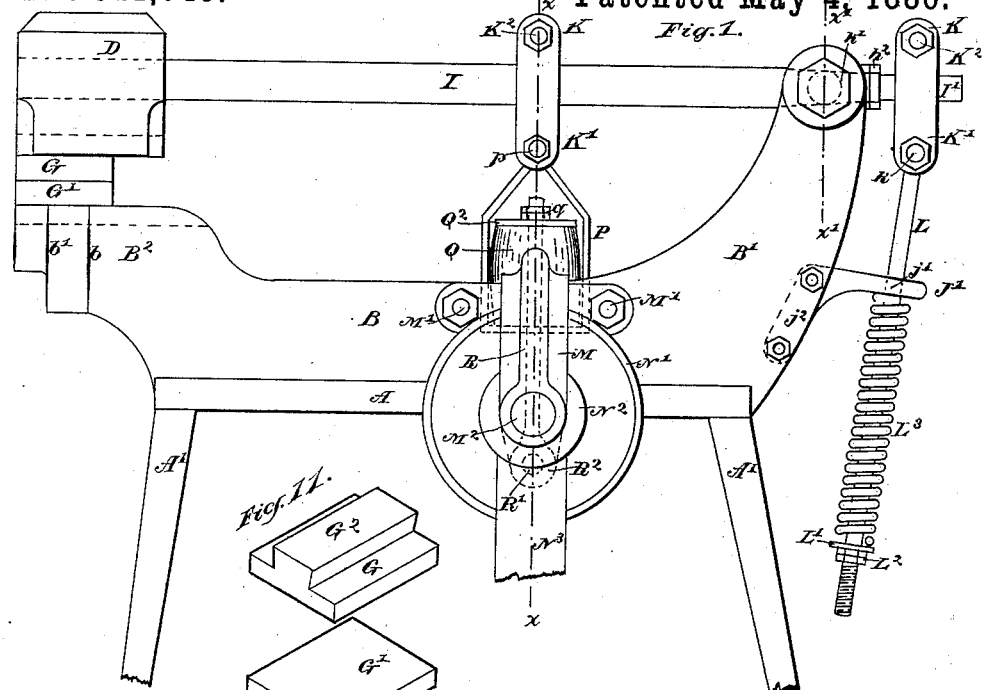
Fig. 1.
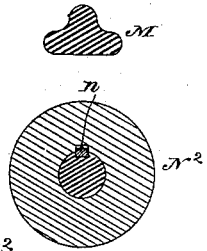
Fig. 11.
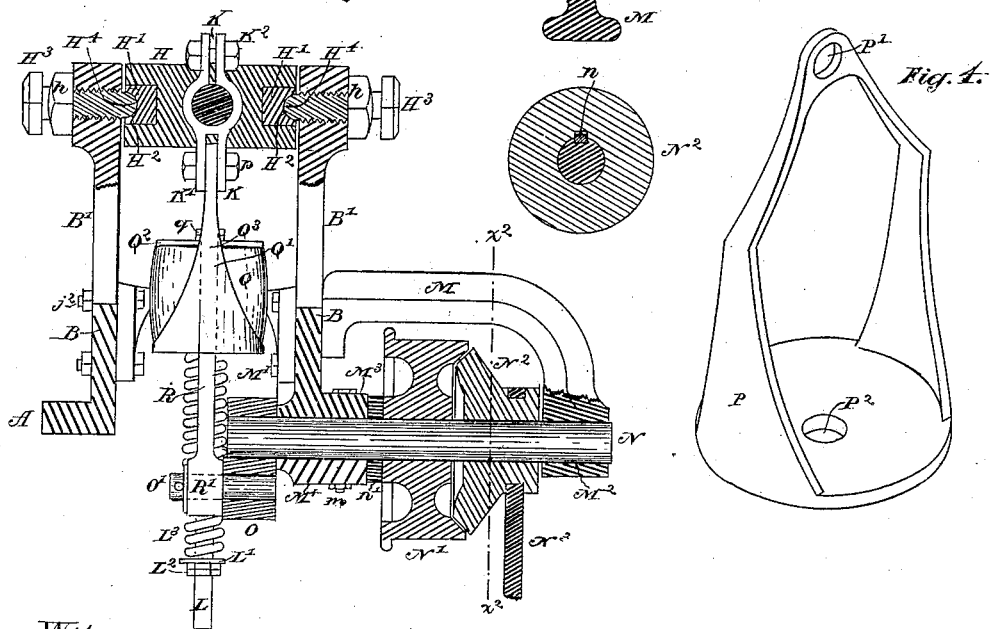
Fig. 2.
Fig. 3.
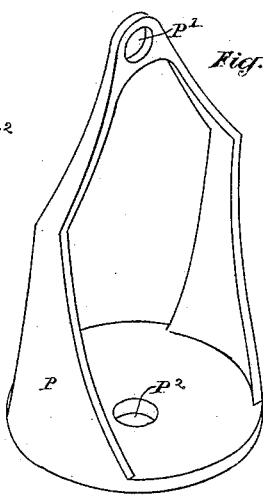
Fig. 4.
Witnesses.
H. A. Stoddard
A. R. Morgan
Inventor.
Thomas V. Norris,
per L. L. Morrison, Atty.
N. PETERS, Photo-Lithographer, Washington, D. C.

(No Model.) 2 Sheets—Sheet 2.
T. V. NORRIS.
POWER HAMMER.
No. 341,045. Patented May 4, 1886.
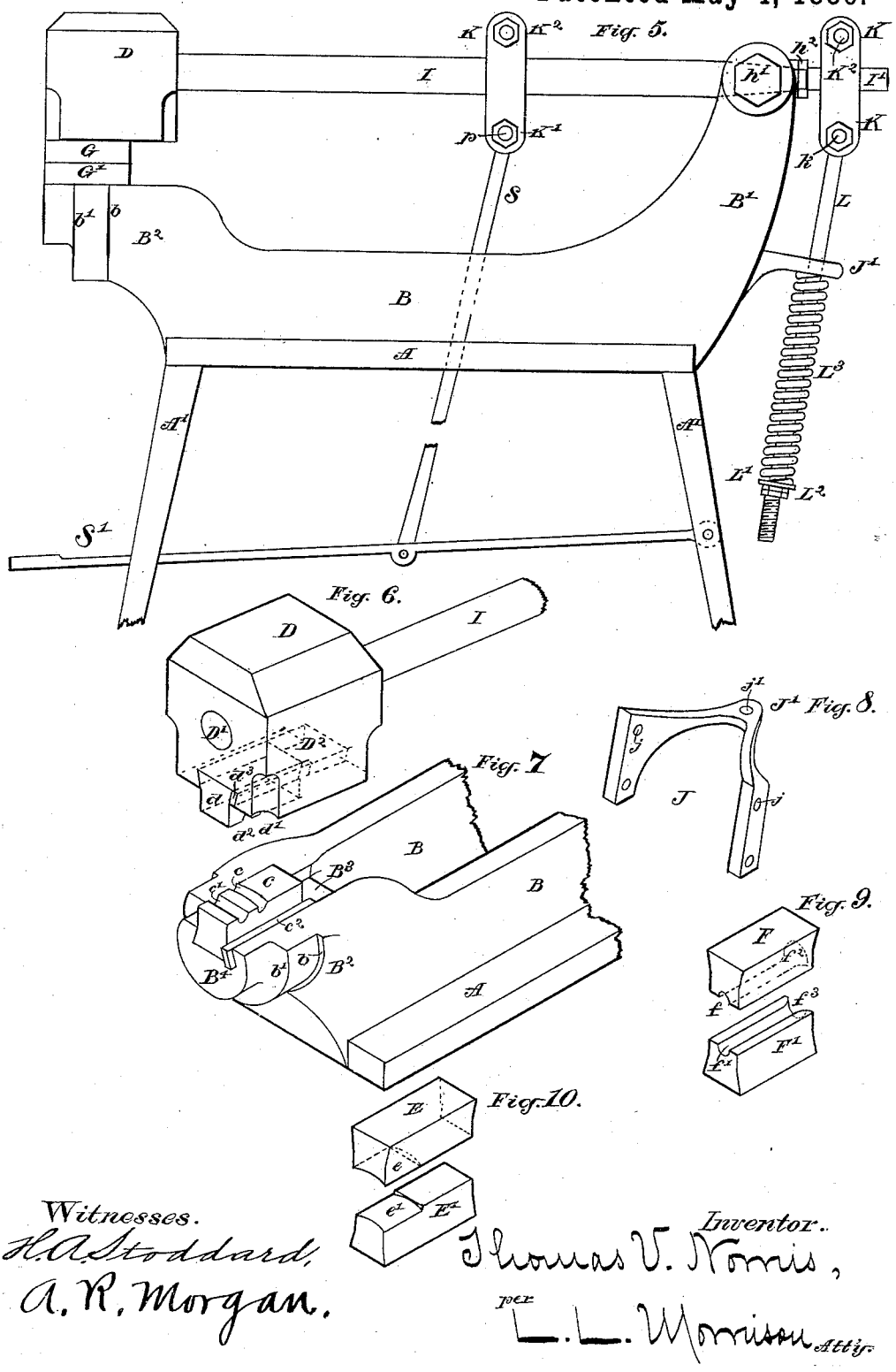
Witnesses.
H. A. Stoddard,
A. R. Morgan.
Inventor.
Thomas V. Norris,
per L. L. Morrison, Atty.

UNITED STATES PATENT OFFICE.

THOMAS V. NORRIS, OF ROCKFORD, ILLINOIS.

POWER-HAMMER.

SPECIFICATION forming part of Letters Patent No. 341,045, dated May 4, 1886.

Application filed November 16, 1885. Serial No. 182,956. (No model.)

*To all whom it may concern:*

Be it known that I, THOMAS V. NORRIS, a citizen of the United States, residing at Rockford, in the county of Winnebago and State of Illinois, have invented certain new and useful Improvements in Portable Power-Hammers, of which the following is a specification.

The object of this invention is to provide iron and steel workers with a portable power-hammer combining the advantages of simplicity of construction, great strength, and moderate expense.

This invention consists in so constructing a portable power-hammer that it may be readily converted from a steam or water power into a foot-power hammer, and vice versa, by simply changing the motive mechanism.

This invention further consists in so constructing the hammer-head and anvil and their attachments that the hammer can be used most successfully for welding rings, bands, tires, and so forth, in addition to the ordinary work performed by power-hammers.

In the accompanying drawings, which form part of this specification, Figure 1 represents a view of a right-side elevation of my hammer. Fig. 2 represents a view of partial transverse vertical sections of portions of Fig. 1 through the dotted lines $x$ $x$ and $x'$ $x'$. Fig. 3 represents a view of a transverse vertical section of parts of Fig. 2 through the dotted lines $x^2$ $x^2$. Fig. 4 represents a view in detail of a part of Figs. 1 and 2. Fig. 5 represents a view of Fig. 1 converted into a foot-power hammer. Fig. 6 represents an isometrical view of the hammer-head and a welding-die. Fig. 7 represents an isometric view of the anvil and counterpart welding-die. Fig. 8 represents a view of a detached portion of Figs. 1 and 5 in detail. Figs. 9, 10, and 11 represent views of various attachments.

Similar letters refer to similar parts throughout the several views.

A represents a bed-piece; A', legs supporting the same.

B represents vertical flanges; B', standards preferably continuous with the former.

$B^2$ represents a bed-frame provided with a vertical dovetailed die-slot, $B^3$, for retaining removable dies and anvil-faces in position.

$B^4$ represents an anvil-horn having the abrupt shoulders $b$ $b'$, which serve to hold in position ring, band, and tire material, and the like while the operation of welding is in progress.

I prefer casting the bed-piece A, flanges B, standards B', and anvil-horn $B^4$ in one piece, though they may be cast separately, if desired.

C represents a lower ring-welding die, the lower part thereof being made in form of a dovetail.

$c$ $c'$ represent, respectively, welding and forming grooves in the die C.

$c^2$ represents a key for securing the die C in the slot $B^3$.

D represents a hammer-head provided with a helve-eye, D', and vertical dovetailed die-slot $D^2$.

$d$ represents an upper ring-welding die, the upper part thereof being made in form of a dovetail.

$d'$ $d^2$ represent, respectively, welding and forming grooves in the die $d$.

$d^3$ represents a key for securing the die $d$ in the slot $D^2$.

E E' represent, respectively, upper and lower band and tire welding dies, the former provided with a concave welding-face, $e$, the latter provided with a counterpart convex welding-face, $e'$.

F F' represent bolt-eye dies having semi-cylindrical longitudinal grooves $f$ $f'$, trumpet-shaped at $f^2$ $f^3$.

G G' represent, respectively, a hammer-face and a counterpart anvil-face having the dovetails $G^2$ $G^3$.

The pairs of dies $d$ C, E E', F F', and pair of faces G G' are respectively interchangeable.

H represents a cross-head, into the ends of which are set hardened steel cubes H'—a preferable form—the latter being provided with hemispherical joint-sockets $H^2$.

$H^3$ represents hardened-steel screw-bolts having hemispherical inner ends, $H^4$, the latter being counterparts of and oscillating in the sockets $H^2$ while the hammer is in operation.

$h$ represents set-nuts for securing the screw-bolts $H^3$ in position.

$h'$ represents the position of a transverse tapering circular hole through the cross-head H.

I represents a helve, preferably of steel, passed through the eye D' of the hammer-head D, and through the tapering hole $h$ of the cross-head H, the tapering end I' of the helve I being secured to the cross-head H by means of the tapering hole $h'$ and nut $h^2$.

J J' represent combined braces and spring-stop.

$j\ j'$ represent circular openings through the last-named parts.

$j^2$ represents bolts for securing the braces J and spring-stop J' to the flanges B.

K represents adjustable helve-clamps provided with downward-projecting jaws K'.

$K^2$ represents bolts for securing the clamps K to any desired point along the helve I.

L represents an adjustable rod, jointed at its upper end to the jaws of the clamp K by means of a bolt, $k$, and provided at its lower end with a spring-stop, L', and nut $L^2$.

$L^3$ represents a powerful spiral spring for raising the head D and helve I of the hammer, after each stroke has been given.

M represents a curved arm bolted to the flange B by means of the bolts M', and provided with a journal-bearing, $M^2$.

$M^3\ M^4$ represent, respectively, a journal cap and pillow, the former cast in the lower side of the bed-piece A and the latter being secured in position by the bolts $m$.

N represents a shaft; N', a loose driving female friction-pulley.

$N^2$ represents a male friction-pulley having lateral motion, but compelled by the spline $n$ to revolve with the shaft N.

$N^3$ represents the upper portion of a pulley-shipper, which can be most conveniently operated by the foot of a workman.

$n'$ represents a washer.

O represents a crank-wheel; O', a crank-pin.

P represents a cushion-cage provided with the circular holes P' $P^2$.

$p$ represents a bolt passed through the jaws K' of the clamp K, and the hole P' of the cage P, the bolt $p$ being of less diameter than the hole P'.

Q represents a cylindrical rubber cushion, having a vertical cylindrical hole, Q', through the center thereof.

$Q^2$ represents a circular follower having a central perforation, $Q^3$.

R represents a pitman-rod, the lower end whereof has a circular opening, R', through the boss $R^2$, for admitting the crank-pin O', the upper end whereof is passed through the hole $P^2$ of the cage P, the hole Q' of the cushion Q, and the opening $Q^3$ of the follower $Q^2$, and secured in position by means of a nut, $q$.

By removing the motive mechanism secured in position by the bolts M' $M^3$ and $p$, and substituting therefor the connecting-rod S and treadle S' the hammer may be effectively operated by means of foot-power.

The use of the steel helve I, rubber cushion Q and spiral spring $L^3$ give great elasticity to the blows of the hammer, and serve to distribute their shock so evenly that all parts of the hammer are thoroughly protected from injury thereby.

The force of the hammer-blows may be increased or diminished by different obvious adjustments of the helve-clamps K and nuts $L^2\ q$.

I claim as new—

1. In a portable power-hammer, a bed-frame having a horn provided with abrupt shoulders and furnished with a vertical dovetailed die-slot, substantially as described, and for the purpose specified.

2. In a power-hammer, the combination of the bed-frame $B^2$, having the horn $B^4$, provided with the shoulders $b\ b'$ and dovetailed die-slot $B^3$, with the die C, having the grooves $c\ c'$, the hammer-head D, having the counterpart die, $d$, with the grooves $d'\ d^2$ therein, and mechanism for operating said hammer-head, substantially as and for the purpose set forth.

3. The combination, with the arm M, having the journal-bearing $M^2$, of the journal N, friction-pulleys N' $N^2$, crank-wheel O, crank-pin O', pitman R, cushion-cage P, rubber cushion Q, follower $Q^2$, clamp K, bolt $p$, steel helve I, and hammer-head D, substantially as described.

THOS. V. NORRIS.

Witnesses:
 THEO. M. CARPENTER,
 L. L. MORRISON.